US012798485B2

(12) United States Patent
Mcleod

(10) Patent No.: US 12,798,485 B2
(45) Date of Patent: Nov. 17, 2026

(54) TRUCK MOUNTED FOLDING STEP AND LADDER

(71) Applicant: Mark Mason Mcleod, Kamloops (CA)

(72) Inventor: Mark Mason Mcleod, Kamloops (CA)

(73) Assignee: MARXSTEP PRODUCTS LTD., Kamloops (CA)

( * ) Notice: Subject to any disclaimer, the term of this patent is extended or adjusted under 35 U.S.C. 154(b) by 922 days.

(21) Appl. No.: 17/718,547

(22) Filed: Apr. 12, 2022

(65) Prior Publication Data

US 2022/0332253 A1 Oct. 20, 2022

Related U.S. Application Data

(60) Provisional application No. 63/175,818, filed on Apr. 16, 2021.

(30) Foreign Application Priority Data

Apr. 16, 2021 (CA) ...................................... 3115416

(51) Int. Cl.
*B60R 3/02* (2006.01)

(52) U.S. Cl.
CPC ...................................... *B60R 3/02* (2013.01)

(58) Field of Classification Search
CPC ................ B60R 3/02; B60R 3/07; B60R 9/06
USPC ........................................................... 182/127
See application file for complete search history.

(56) References Cited

U.S. PATENT DOCUMENTS 1,347,116 A * 7/1920 Morgan ............... A47B 96/061 248/240.4
1,892,687 A * 1/1933 Teufel ................ A47G 25/0685 33/8
2,851,312 A * 9/1958 Hoff ........................ E06C 1/387 182/132

(Continued)

FOREIGN PATENT DOCUMENTS

CN 203902405 U 10/2014

OTHER PUBLICATIONS

UES International, "Steps & Ladders", UES International Product Catalogue, 2021, pp. 266-276, Retrieved from <https://www.uesint.com/catalogues/>, Retrieved on Jun. 30, 2022.

(Continued)

*Primary Examiner* — Christopher Garft
(74) *Attorney, Agent, or Firm* — NORTON ROSE FULBRIGHT CANADA LLP

(57) ABSTRACT

A folding or collapsible step platform and ladder mounts onto the frame of a semi-truck adjacent the engine and front wheel of the truck. The step platform is pivotally mounted to a base which mounts to the frame. A ladder is pivotally mounted to the end of the step platform opposite the base. The base elevates the step platform so that, when the step platform is deployed and rotated to a horizontal position, the step platform crosses over the wheel without interference with the wheel. When in that horizontal position the length of the step platform positions the outboard end of the step platform to an outside of the wheel so that, when the ladder is pivoted downwardly from the outboard end of the step platform and the step platform is horizontal, the ladder hangs so as to cross downwardly over the outside of the wheel ready for use.

21 Claims, 8 Drawing Sheets

(56) References Cited

U.S. PATENT DOCUMENTS

| | | | | | |
|---|---|---|---|---|---|
| 3,590,950 | A | | 7/1971 | Wilson | |
| 4,782,961 | A | | 11/1988 | Lange | |
| 4,800,987 | A | | 1/1989 | Liles | |
| 4,947,961 | A | | 8/1990 | Marquez | |
| 5,133,429 | A | | 7/1992 | Weipert | |
| 6,003,633 | A | * | 12/1999 | Rolson | E06C 5/02<br>182/127 |
| 6,044,928 | A | | 4/2000 | Law et al. | |
| 6,550,578 | B1 | | 4/2003 | Law et al. | |
| 6,767,023 | B1 | | 7/2004 | Nicholson | |
| 6,837,467 | B2 | * | 1/2005 | Cheng | A47B 46/005<br>108/108 |
| 7,168,523 | B1 | | 1/2007 | Tafoya et al. | |
| 7,261,357 | B1 | * | 8/2007 | Bechen | B60R 3/02<br>296/57.1 |
| 7,673,922 | B1 | * | 3/2010 | Grimes | B60R 3/02<br>280/166 |
| 7,857,274 | B1 | * | 12/2010 | Parks | A01K 1/0356<br>248/230.1 |
| 9,500,029 | B1 | * | 11/2016 | Mullins | E06C 5/24 |
| 11,628,775 | B1 | * | 4/2023 | Lewis | B60R 3/02<br>280/166 |
| 2002/0070577 | A1 | * | 6/2002 | Pool, III | B60R 3/02<br>296/62 |
| 2002/0189899 | A1 | * | 12/2002 | Hedley | E02F 9/0833<br>182/127 |
| 2010/0019468 | A1 | * | 1/2010 | Price | B60R 3/007<br>280/165 |
| 2010/0025954 | A1 | * | 2/2010 | Gottlinger | B60R 3/02<br>280/166 |
| 2010/0122871 | A1 | * | 5/2010 | Gottlinger | E06C 5/02<br>182/106 |
| 2011/0168491 | A1 | * | 7/2011 | Cheatham, Jr. | E06C 5/24<br>280/166 |
| 2022/0009418 | A1 | * | 1/2022 | Demonte | B60R 3/02 |

OTHER PUBLICATIONS

Grainger Canada, "STEP3-RUNG Retr BLK20INW X 32.5INH", Exterior Automotive Accessories, Retrieved from <https://www.grainger.ca/en/product/STEP3-RUNG-RETR-BLK20INW-X-32-5INH/p/BUY5233000?searchBar=true&nls=NLSAA_11-1>, Retrieved on Jun. 30, 2022.

Ovesco, "One Step Safety Step", Ladders & Steps, dated May 9, 2018, Retrieved from Wayback machine on Jul. 4, 2022, Retrieved from <https://web.archive.org/web/20180509003008/https://www.ovesco.com.au/products/more-hardware/handles-ladders-and-steps/ladders-and-steps/one-step-safety-step/>.

Ovesco, "Two Step Safety Step", Ladders & Steps, dated Apr. 23, 2017, Retrieved from Wayback machine on Jul. 4, 2022, Retrieved from <https://web.archive.org/web/20170423111013/https://www.ovesco.com.au/products/more-hardware/handles-ladders-and-steps/ladders-and-steps/two-step-safety-step/>.

Ovesco, "Three Step Safety Step", Ladders & Steps, dated Apr. 23, 2017, Retrieved from Wayback machine on Jul. 4, 2022, Retrieved from <https://web.archive.org/web/20170423110709/https://www.ovesco.com.au/products/more-hardware/handles-ladders-and-steps/ladders-and-steps/three-step-safety-step/>.

Truck Trailer Spares, "Heavy Duty Slide out Step Ladder—3 STEP—Zinc Plated", [Online] [Retrieved on Nov. 27, 2022] Archived on Wayback Machine Apr. 6, 2021, Retrieved from internet: <https://web.archive.org/web/20210406223630/https://trucktrailerspares.com.au/product-category/container-van/trailer-safety-ladders/>.

IRS, "Triple step retractable vehicle ladder zinc plated", Folding Steps, dated Mar. 4, 2021, Retrieved from Wayback machine on Jul. 4, 2022, Retrieved from <https://web.archive.org/web/20210304125904/https://www.indrub.com.au/triple-step-retractable-ladder-zinc-plated.html>.

* cited by examiner

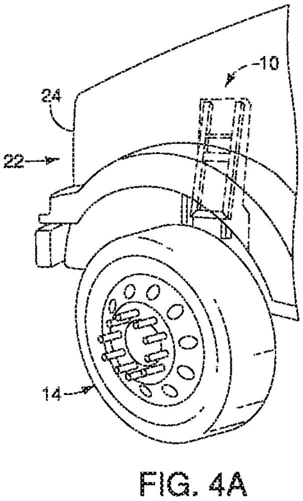
FIG. 4A
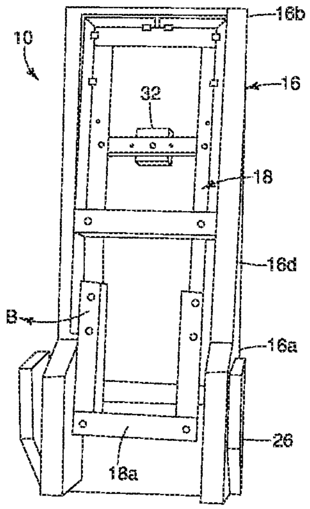
FIG. 5
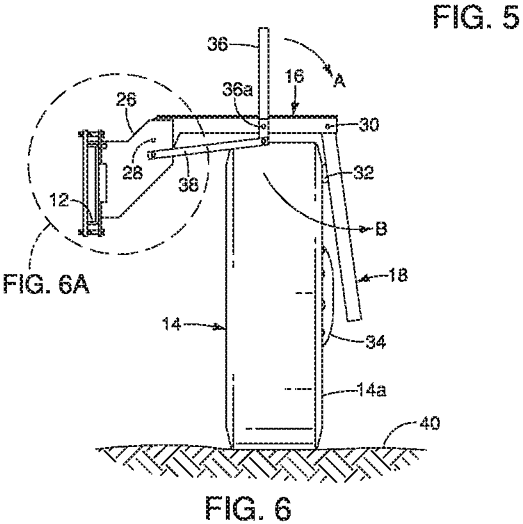
FIG. 6A
FIG. 6

TRUCK MOUNTED FOLDING STEP AND LADDER

CROSS-REFERENCE TO RELATED APPLICATIONS

This application claims the benefit of U.S. Provisional patent application No. 63/175,818 and Canadian patent application no. 3,115,416, both of which were filed on Apr. 16, 2021 and are entitled "Truck Mounted Folding Step and Ladder" and both of which are incorporated herein by reference.

FIELD

This disclosure relates to the field of ladders used for large motor vehicles and in particular for semi-trucks or tractors having the driver cabin located behind the engine.

BACKGROUND

In the prior art applicant is aware of United States patent application publication number US 2010/0122871, which published on May 20, 2010, in the application of Gottlinger for a Tractor Tire-Mountable Folding Step Ladder. Gottlinger describes a portable truck tire mountable stepladder which is foldable and which Gottlinger states improves an operator's ability to climb and carry tools to the engine compartment of a truck-tractor or similar vehicle where the operator needs to safely perform inspections and routine maintenance on a daily basis. Gottlinger describes the tire mountable folding step ladder for temporary attachment to a tire of a front wheel proximate an engine compartment of a tractor, truck cab or the like as including the tire mountable step assembly and a tire mountable handrail assembly linked to the step assembly so as to cooperate therewith and to provide a stable step ladder for the operator to climb over the tire towards the engine compartment of the tractor. When not in use, the step must be removed and stowed away on the vehicle including during operation of the vehicle.

As stated by Gottlinger, it is known in the prior art that tractor-trailer operators need to access the engine compartment of large motor vehicles such as tractor-trailers for servicing in all types of weather. Gottlinger observes that operator steps which are detachably engaged with a truck's front wheel and tire include U.S. Pat. Nos. 2,851,312; 3,590,950; 4,800,987; 4,947,961; 5,133,429; 7,168,523; 6,767,023; 6,550,578; 6,044,928; and 4,782,961, which all provide one or more steps for climbing and all of which appear to have structure engaging the inner sidewall, tread and outer sidewall of a truck tire; and, wherein most of this prior art appears to be supported entirely by the truck tire or wheel, some appearing to engage the ground for additional support.

SUMMARY

The present disclosure relates to a folding or collapsible step and ladder apparatus for mounting to the frame of a semi-truck or tractor, and in particular, on semi-trucks or tractors having the driver cabin located behind the engine of the truck. When the driver needs to access the front end of the truck, for example the engine or the windshield, instead of climbing onto the front tire of the truck the driver deploys the truck-frame-mounted folding step and ladder to thereby climb to an elevation sufficient for service and maintenance of the truck, including the daily cleaning of the windshield, wiper replacement and like servicing. In particular, the present disclosure relates to a folding or collapsible step and ladder which releasably mounts onto the frame of the truck where the frame extends forwardly under the engine alongside the front tires, and wherein the step and ladder unfold from a storage position folded against one another substantially vertically above the frame to a deployed position wherein the step forms a horizontal step platform which extends over the tire and wherein the ladder swings downwardly from under the step so as to lay along or slightly inclined away from the outside of the tire opposite from the frame. In some embodiments, the ladder may telescopically slide into a cavity formed by opposite rails of the step platform so as to collapse the ladder into the platform cavity for storage, rather than folding the ladder against the step platform for storage.

In accordance with the present disclosure there is provided a folding step and ladder apparatus for mounting onto the frame of a semi-truck. The semi-truck is of the kind where the engine is in front of the cab of the truck and the frame extends forwardly under the engine and adjacent a correspondingly located front wheel of the truck.

In some embodiments, the folding or collapsible step and ladder includes a base adapted to mount onto the frame, adjacent the engine and front wheel of the truck. A step platform is mounted to the base. In particular, the step platform includes first and second opposite ends so as to define a length extending from the first end to the second end. The first end of the step platform is pivotally mounted to an upper end of the base.

The folding or collapsible step and ladder also includes a ladder having first and second opposite ends, wherein the first end of the ladder is pivotally mounted to the second end of the step platform.

In a preferred embodiment, the upper end of the base elevates the first end of the step platform to a first elevation relative to a lower end of the base, wherein, when the lower end of the base is mounted to the frame, and the upper end of the base is at the first elevation, the first end of the step platform is elevated above an uppermost surface of the front wheel of the truck. When the step platform is deployed and rotated to a horizontal position, the step platform thus crosses over the upper surface of the wheel without interference with the wheel. When in that horizontal position the length of the step platform positions the second end of the step platform to an outside of the wheel so that, when the ladder pivots downwardly from the second end of the step platform and the step platform is horizontal, the ladder hangs so as to cross downwardly over the outside of the wheel. The ladder is thereby positioned for use by an operator of the truck ascending the ladder for maintenance on the truck.

The ladder is free to pivot downwardly relative to the step platform so as to rest against the step platform when the step platform is pivoted to the vertical so as to be in a storage position substantially vertically aligned over the base, above the frame. When the step platform is in its storage position, and when the ladder is rotated down onto the step platform, or alternatively, when the ladder is slid into a cavity of the step platform defined by first and second rails of the step platform so as to telescopically collapse the ladder inside the platform cavity, such that the ladder is also in its storage position, the step platform and ladder are adjacent and alongside the engine and vertically adjacent the frame. Advantageously the ladder is sized and shaped to nest within or against the step platform when the step platform is in its storage position and the ladder is pivoted down so as to rest against the step platform to reduce the width of the collapsed and folded-in step platform and ladder.

The truck includes a hood. The hood includes a mud guard on each interior side of the hood. Collectively the hood and mud guards form or define a wheel well which covers the front wheel on each side of the frame when the hood is closed over the engine. When the hood is closed the mud guard for each wheel well extends downwardly between the front wheel and the engine. When the step platform and ladder are mounted on the frame, and in their storage positions above the frame, the corresponding mud guard covers the step platform and ladder to inhibit mud from splashing onto the step platform and ladder.

Further advantageously the base includes a stop, and the first end of the step platform abuts against the stop when the step platform is horizontal. Optionally a spacer, such as a resilient block, is mounted to the ladder and positioned on the ladder so as to engage against the outside of the wheel when the ladder is hanging down from the step platform and the step platform is horizontal. The spacer inclines the ladder outwardly from the second end of the step platform so that the ladder does not contact, for example swing against, the wheel.

In some embodiments, the apparatus further comprises an elongate platform handle, the platform handle having a free handle end and an opposite platform end. The platform end of the platform handle is pivotally mounted to both the step platform and to a first end of a linkage member, the linkage member having a second end opposite the first end of the linkage member, and the second end of the linkage member is pivotally mounted to the base. When the step platform is pivoted to the vertical so as to be in a storage position, the platform handle pivots so as to be substantially aligned with the step platform, and when the step platform is pivoted to the horizontal so as to be in the horizontal position, the platform handle pivots relative to the step platform so as to extend vertically upwards from and perpendicular to the length of the platform. Thus, the handle end of the platform handle is available for use by the operator of the truck to grasp the handle end when ascending the ladder for maintenance on the truck.

BRIEF DESCRIPTION OF THE DRAWINGS

FIG. 4A is the view of FIG. 3 with the hood closed over the engine and over the folding step and ladder in its storage position so that the mud flaps under the hood segregate the folding step and ladder from the wheel.

FIG. 5 is a side elevation view of the folding step and ladder in its storage position.

FIG. 6 is, in front elevation view, the folding step and ladder of FIG. 5 in its deployed position over a truck front wheel.

DETAILED DESCRIPTION

Figure 1:
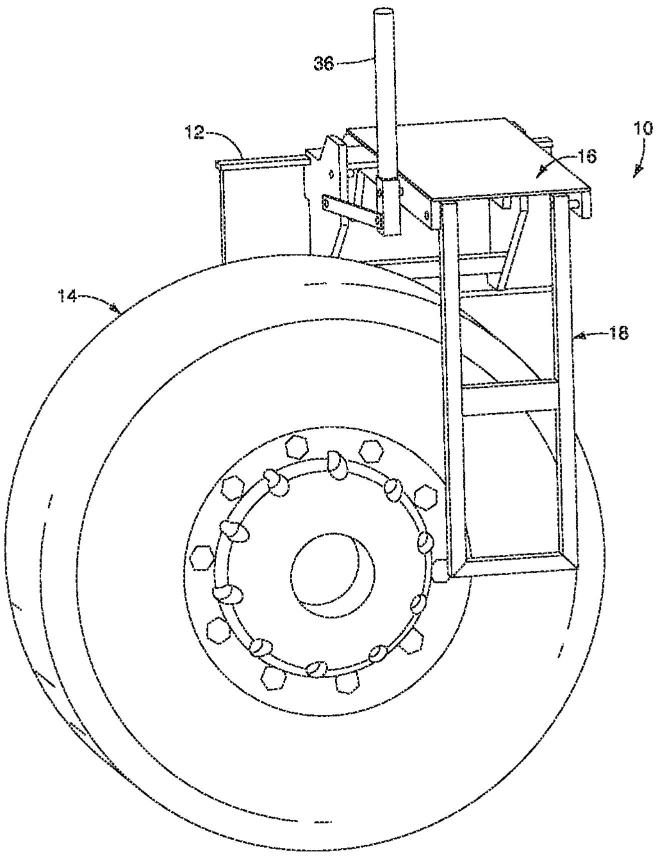
FIG. 1 is, in perspective view, the folding step and ladder apparatus according to an embodiment of the present disclosure, deployed so as to extend a step portion over a front wheel of an engine-in-front-of-cab truck and so as to hang a ladder downwardly from the step portion over the outside of the wheel.

As seen in the accompanying figures wherein like reference numerals denote corresponding parts in each view, as seen in FIG. 1, folding step and ladder 10 mounts onto truck frame member 12. In the deployed position as depicted, ladder 10 extends over truck tire 14 and in particular step platform 16 extends horizontally over tire 14 so that step ladder 18 hangs downwardly substantially vertically down along the outside of the tire. In other embodiments step ladder 18 hangs slightly outwardly inclined from the tire, resting against the outside of the tire or rim by means of a spacer block 32 mounted to the ladder, as best viewed in FIG. 6. Use of the deployed step and ladder allows the operator 20, illustrated in subsequent views, to ascend the ladder 18 and stand on step platform 16 so as to then maintain or service the truck-tractor 22 seen for example in FIG. 2.

Figure 2:
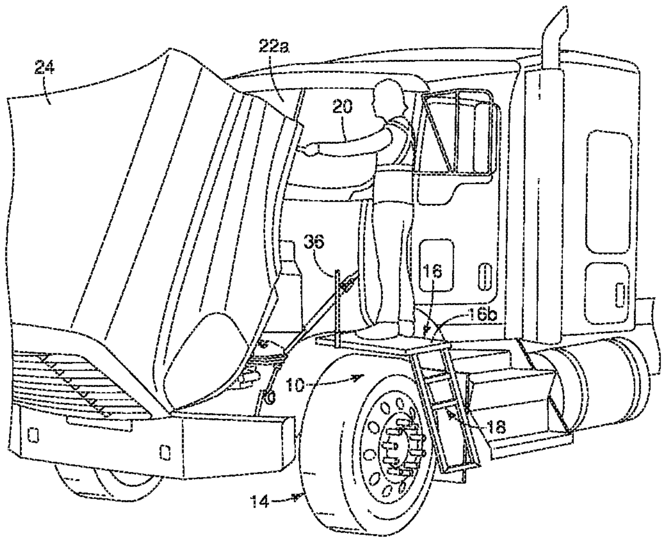
FIG. 2 is a view of an operator standing on the step of FIG. 1 so as to service the windshield of the truck, shown in partially cut-away front perspective view.

As seen in FIG. 2, operator 20 is standing on step platform 16 so that, with the truck hood 24 open, operator 20 conveniently may reach the windshield 22*a* for example so as to clean the windshield.

Figure 3:
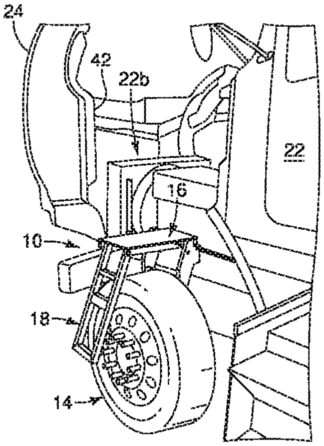
FIG. 3 is, in rear perspective view, the engine of the truck exposed by the open hood, and showing the folding step and ladder of FIG. 1 mounted to the truck frame and deployed over the left front wheel of the truck.
Figure 6A:
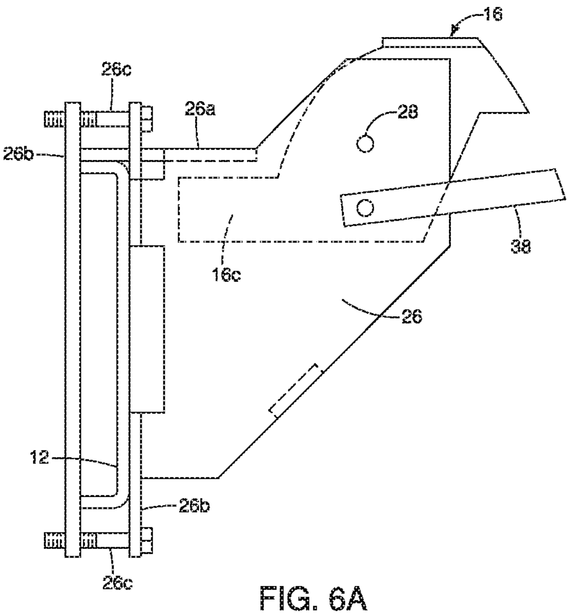
FIG. 6A is an enlarged view of the base of the folding step and ladder of FIG. 6.

As seen in FIG. 3, with hood 24 open so as to expose the truck engine 22*b*, the exposed frame member 12 may be seen extending forwardly and substantially longitudinally underneath engine 22*b*, and adjacent the corresponding front wheel 14. Truck frame member 12 provides a rigid mounting surface for base 26. Thus as better seen in FIG. 4 base 26 is mounted to frame member 12 so as to position folding step and ladder 10 adjacent to its corresponding tire 14. Step platform 16 deploys outwardly of frame member 12 and over tire 14 by pivoting in direction A about its hinge 28 (as seen in FIG. 6). Step platform 16 is pivotally mounted to base 26 by hinge 28 at the base end 16*a* of platform 16. Base 26 positions hinge 28 at a sufficient elevation so that step platform 16 may pivot about hinge 28 to a horizontal position over tire 14. A stop 26*a* formed by a flat plate on base 26 arrests the pivoting of step platform 16 about hinge 28, and in particular, dog-leg 16*c* (shown in dotted outline in FIG. 6A) rotates up and under, so as to contact, stop 26*a* as step platform 16 pivots to the horizontal.

Ladder 18 is pivotally mounted to the distal end 16*b* of step platform 16 by means of ladder hinge 30. Thus, as platform 16 is deployed in direction A, ladder 18 is swung outwardly in direction B relative to platform 16 to clear the base end 18*a* of ladder 18 over tire 14 as platform 16 is deployed so as to rotate from its vertical orientation to its horizontal orientation.

With ladder 18 fully deployed to its vertical position, or slightly off-vertical position (when a resilient block 32 is used), by pivoting in direction B, and with platform 16 rotated to horizontal by pivoting in direction A, the resulting deployed position of folding step and ladder 10 has ladder 18 extending downwardly over the outer surface 14*a* of tire 14. Ladder 18 may have three rungs as illustrated, and may extend downwardly to just below the center of rim 34 and tire 14, but this is not intended to be limiting, as ladder 18 may be longer and may include more or less rungs. As ladder 18 is free to swing about its hinge when platform 16 is deployed, and with platform 16 extending horizontally so that distal end 16*b* is substantially aligned with the outer surface 14*a* of tire 14, ladder 18 will, without any further support, hang vertically from distal end 16*b* of platform 16 substantially parallel with outer surface 14*a* of tire 14.

As seen in FIG. 6, advantageously a resilient block 32, such as a rubber block, may be mounted behind ladder 18 for example and may be conveniently centered behind the uppermost ladder rung 18*c*. Block 32 rests against the upper portion of outer surface 14*a* of tire 14 so as to support ladder 18 slightly outwardly of tire 14. In this manner, ladder 18 is not at risk of contacting and potentially damaging rim 34 on which tire 14 is mounted. Also, the outward inclination of ladder 18 away from tire 14 makes climbing the ladder somewhat easier for operator 20 as operator 20 climbs ladder 18 so as to stand on step platform 16. As will be understood by those skilled in the art, block 32 may not be suitable for use on all makes of trucks. For example, on a so-called long-nose Peterbilt brand truck, the front wheel is set forward thereby rendering block 32 potentially unusable as a rest for the step ladder. In that case, instead of using block 32, a lock-and-pin cantilever system may be used to hold the ladder in place. Other adjustments, such as to relative dimensions, positioning of the base on the frame, etc, are intended to be within the scope of the present disclosure.

In some embodiments, the climbing of ladder 18 by operator 20 is assisted by handle 36 which extends upwardly from step platform 16, providing a free handle end of the handle 36 for use by the operator as a support when the operator is climbing the ladder 18 onto the step platform 16. Advantageously, the handle 36 may be offset from the step for ease of use. In the illustrated embodiment, which is not intended to be limiting, handle 36 is actuated to its upstanding, illustrated as vertical, position by means of a mechanical linkage member 38 which is pivotally pinned at a first end of the linkage member to a lowermost platform end of the handle 36 and pivotally pinned at the opposite second end of the linkage member to base 26. The lowermost platform end of the handle 36 may also be pivotally pinned to the step platform 16. Thus, as step platform 16 is rotated upwardly in a direction opposite to the direction A, linkage member 38 retracts handle 36 about its hinge 36*a* on platform 16 so that, as platform 16 rotates upwardly into a vertical position above the base 26, handle 36 remains vertical and thus moves into alignment with platform 16 when platform 16 is in its retracted, vertical position.

Figure 7:
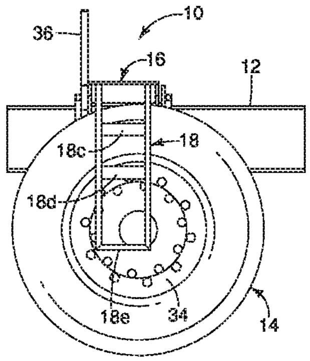
FIG. 7 is, in side elevation view, the deployed folding step and ladder of FIG. 6.
Figure 8:
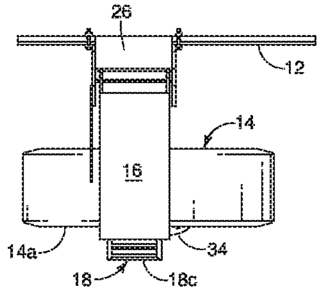
FIG. 8 is, in plan view, the deployed folding step and ladder of FIG. 6.
Figure 9:
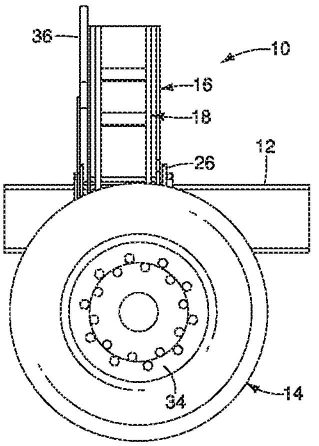
FIG. 9 is, in side elevation, the stowed folding step and ladder of FIG. 4A.
Figure 10:
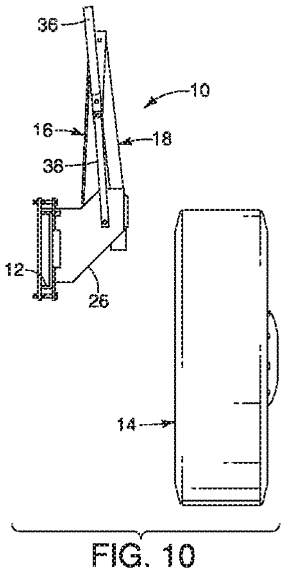
FIG. 10 is, in front elevation view, the stowed folding step and ladder of FIG. 4A.
Figure 11:
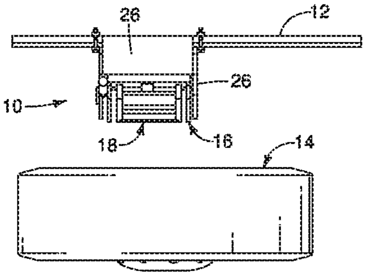
FIG. 11 is, in plan view, the stowed folding step and ladder of FIG. 4A.

Further advantageously, as seen for example in FIG. 7, ladder 18 may include a middle rung 18*d* and a lower rung 18*e*. Lower rung 18*e* is positioned, when platform 16 and ladder 18 are deployed, a convenient distance above ground 40 so that the first step for operator 20 is relatively easily attained as operator 20 reaches upwardly to grasp handle 36.

In the enlarged view of FIG. 6A, one example, without intending to be limiting, is illustrated of the removable mounting of base 26 onto frame 12. Thus in the illustrated example, base 26 is removably mounted onto frame 12 by clamping frame 12 between flanges or plates 26*b* using bolts 26*c*.

Figure 4:
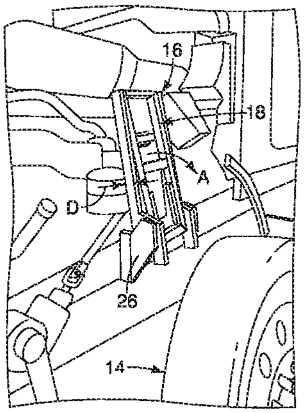
FIG. 4 is, in front perspective view, the truck engine of FIG. 3 showing the folding step and ladder in its storage position folded up and adjacent to the engine.

When folding step and ladder 10 is its storage position such as seen in FIG. 4, a conventional mud guard 42 mounted under the wheel well of hood 24, such as seen for example in FIG. 3, segregates folding step and ladder 10 from wheel 14 when hood 24 is closed such as seen in FIG. 4A. Folding step and ladder 10 in its storage position occupies a sufficiently small depth D that it fits between mud guard 42 and wheel 14 when hood 24 is closed. Mud guard 42 thus protects folding step and ladder 10 from being splashed with mud from wheel 14. The small depth D occupied by folding step and ladder 10 when stored is assisted by the sizing of ladder 18 such that it nests when folded into the frame 16*d* of platform 16.

Referring to FIGS. 12A to 12D, another embodiment of the step and ladder wherein the ladder is telescopically collapsible into a cavity of the step platform for storage, is illustrated. The handle 136 and the base 126 operate similarly to the handle 36 and the base 26 described above. As viewed in FIG. 12A, when the platform 116 is oriented vertically so as to be in a storage position, the ladder 118 is telescopically collapsed into a platform cavity 152, the platform cavity 152 defined by first and second platform rails 116*a*, 116*b*, which platform rails 116*a*, 116*b* extend downwardly from the support surface 116*c* of the step platform 116 when the step platform is in a horizontal orientation, as shown for example in FIGS. 12B to 12D. The platform cavity 152 may be further defined, in some embodiments, by a stop bar 154 attached to flanges 154*a* extending downwardly from the platform rails 116*a*, 116*b*.

As with the embodiments described above, a first end of the platform 116 is pivotally mounted to the base 126, as shown in FIGS. 12A to 12D. The platform 116 has a platform width X that extends from the first platform rail 116*a* to the second platform rail 116*b*, and the ladder 118 has a ladder width Z that extends from the first ladder leg 118*a* to the second ladder leg 118*b*. The ladder width Z may be less than the platform width X, such that the ladder 118 is sized to fit snugly within the platform cavity 152 between platform rails 116*a*, 116*b*.

Figure 12B:
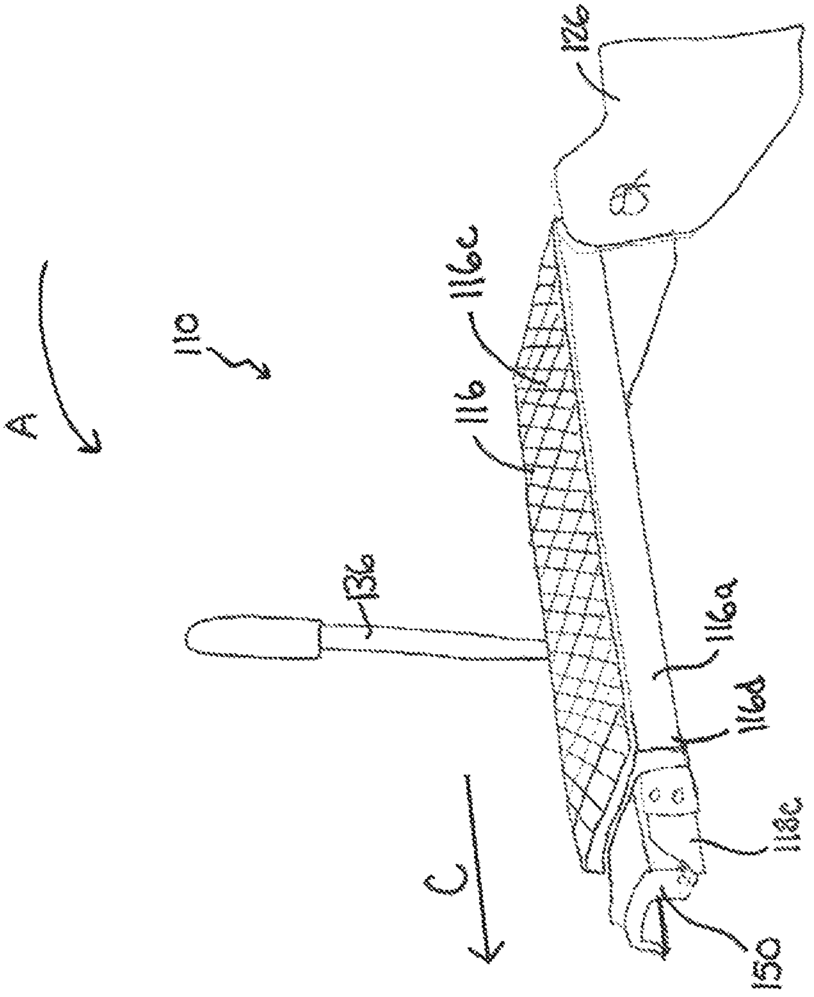
FIG. 12B is, in perspective view, the apparatus of FIG. 12A, showing the step platform in the horizontal position with the ladder telescopically collapsed inside the platform cavity.
Figure 12A:
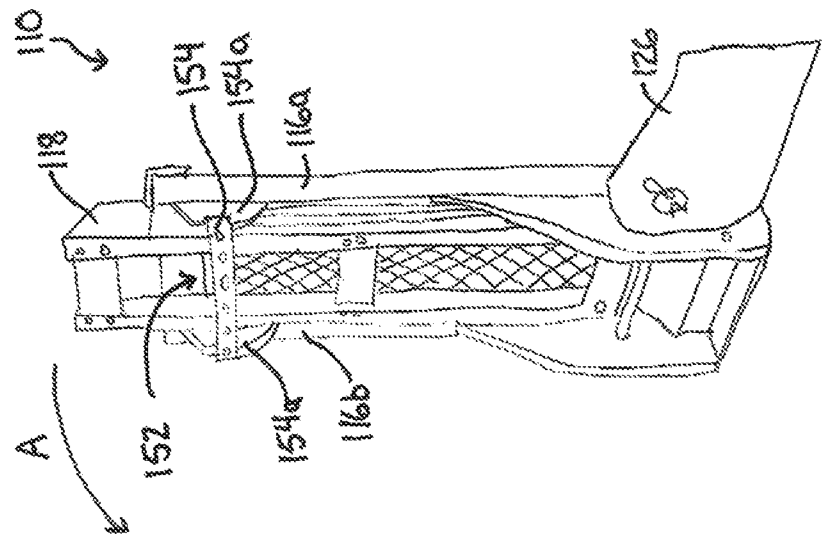
FIG. 12A is, in perspective view, the collapsible step and ladder apparatus according to an embodiment of the present disclosure, showing the collapsible step and ladder in its storage position.

In FIG. 12B, the platform 116 has been rotated in direction A from the storage position shown in FIG. 12A to the horizontal position shown in FIG. 12B. In this position, the ladder 118 remains stowed within the platform cavity 152, with the second end 118*c* of the ladder 118 slightly protruding from the second end 116*d* of the step platform 116. Also visible in FIG. 12B is the ladder handle 150, which handle 150 may be grasped by the operator to slide the ladder 118 out of the platform cavity 152 in direction C.

Figure 12D:
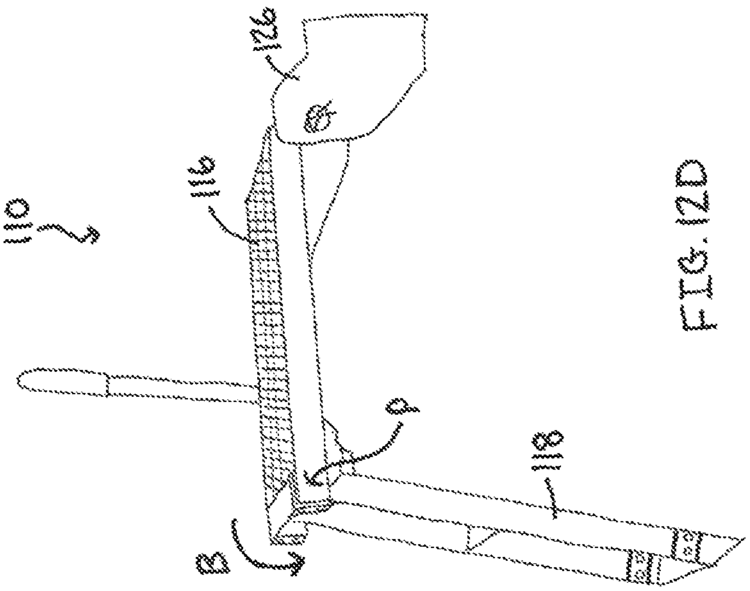
FIG. 12D is, in perspective view, the apparatus of FIG. 12A, showing the fully deployed folding step and ladder.
Figure 12C:
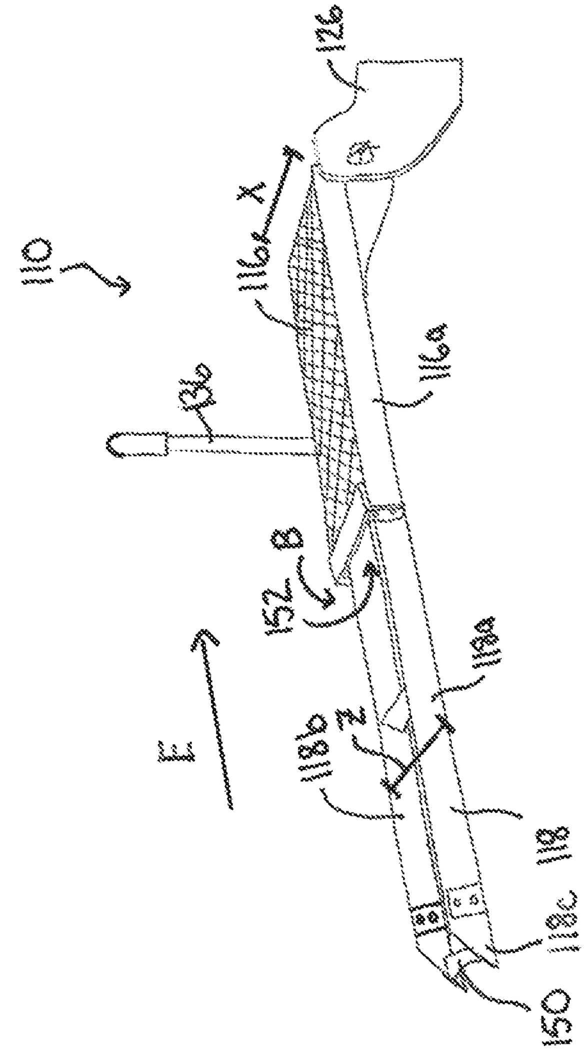
FIG. 12C is, in perspective view, the apparatus of FIG. 12A, showing the step platform and the ladder in their respective horizontal positions and coaxially aligned with one another.

In FIG. 12C, the ladder 118 has been pulled out of the platform cavity 152, so that the second end 118*c* of the ladder 118 is extended away from the platform 116 and the ladder 118 and the platform 116 are coaxially aligned with one another in a horizontal orientation. It will be appreciated that, in order to place the apparatus in the storage position, the ladder 118 would be slid back into the platform cavity 152 in direction E so as to telescopically collapse the ladder 118 within the platform 116. In FIG. 12D, the apparatus is shown in its fully deployed position, with the ladder 118 having rotated in direction B about a pivot point P.

Figure 13A:
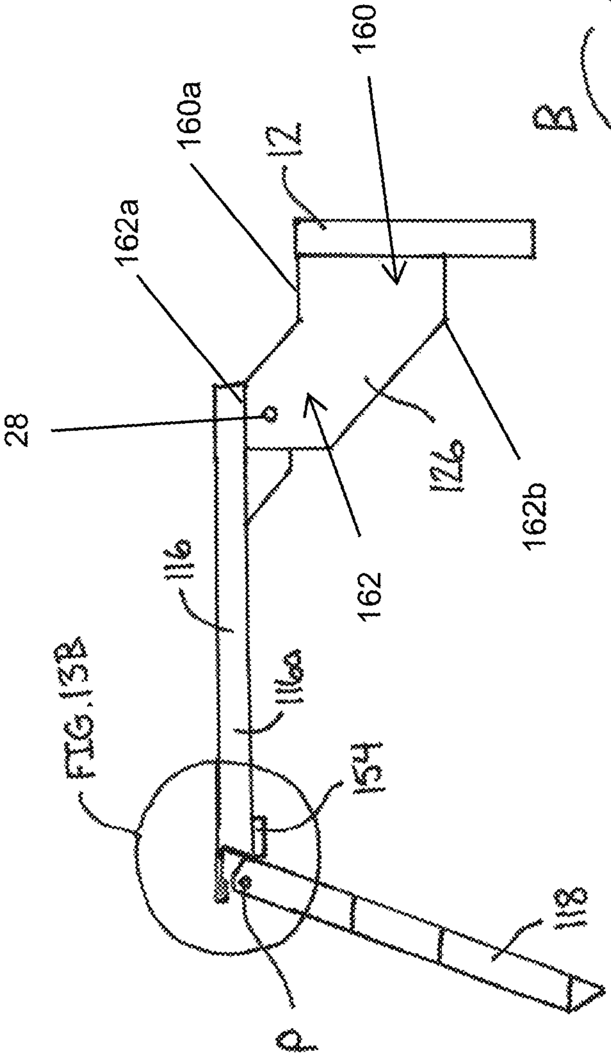
FIG. 13A is, in partial cut-away side elevation view, the apparatus of FIG. 12A in the fully deployed position, showing the internal stopper mechanism for the sliding ladder.
Figure 13B:
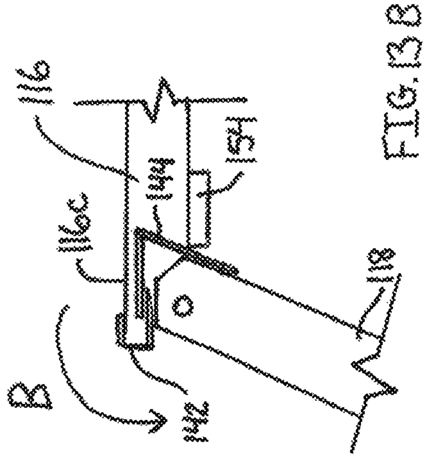
FIG. 13B is a close up view of a portion of FIG. 13A.

FIGS. 13A and 13B show the apparatus of FIGS. 12A to 12D in side elevation view, with a portion of the platform rail 116*a* partially cut away to reveal an embodiment of the stopping mechanism for the ladder 118 to pivot downwardly about pivot point P after sliding out of the platform cavity 152. The stopping mechanism includes a C-shaped flange 142, mounted so as to extend underneath the platform support surface 116*c*, and an L-shaped flange 144, the L-shaped flange 144 mounted to an upper end of the ladder 118 so as to extend towards and into a space between the C-shaped flange 142 and the platform support surface 116*c*. When the ladder 118 is rotated into its horizontal position, as shown in FIGS. 12B and 12C, the L-shaped flange 144 rotates with the ladder and slides into the platform cavity 152. When ladder 118 rotates in direction B into its fully deployed position, the free end of the L-shaped flange 144 mates with the free end of the C-shaped flange 142, as shown in FIG. 13B. Furthermore, the other side of the L-shaped flange 144 hits against the stop bar 154 as the ladder rotates in direction B, thereby limiting the movement of ladder 118 and bringing it to a stop at a desired deployment angle $\alpha$. This stopping mechanism for the embodiment of the apparatus shown in FIGS. 12A to 13B is not meant to be limiting, and it is appreciated that other means of stopping the motion of the ladder 118 as it pivots in direction B to its deployed position are included in the present disclosure.

As also seen in FIG. 13A, the base 126 has an inner end 160 that is adapted to be mounted onto the truck frame 12 adjacent the front wheel 14 (see also FIG. 6) and an upper end 162 that includes the hinge 28 which defines a pivot axis for the platform 116. The upper end 162 of the base 126 defines an upper-end top edge 162*a* that is located vertically above a base-inner top edge 160*a* of the inner end 160. Additionally, the upper end 162 defines an upper-end bottom edge 162*b* that is located vertically below the base-inner top edge 160*a* of the inner end 160. This same configuration may also apply to the base 26 as described above and shown in FIG. 6 for example.

What is claimed is:

1. A folding step and ladder apparatus adapted for mounting onto a frame of a truck, adjacent a front wheel thereof, for use by an operator of the truck for maintenance of a windshield or a wiper of the truck, the apparatus comprising:

- a base having an inner end adapted to be mounted onto the frame adjacent the front wheel and an upper end including a hinge defining a platform pivot axis, the upper end of the base having an upper-end top edge located vertically above a base-inner top edge of the inner end, the upper end having an upper-end bottom edge located vertically below the base-inner top edge of the inner end;
- a step platform having a length extending from a first end to a second end of the step platform, the step platform defining a plane extending along the length between the first end and the second end, wherein the first end of the step platform is pivotally mounted to the upper end of the base by said hinge, the step platform being pivotable about the platform pivot axis of the hinge between a vertical storage position and a horizontal deployed position;
- a ladder having an upper end and a lowermost end opposite the upper end, the upper end of the ladder being pivotally mounted to the second end of the step platform such that the ladder is pivotable, about a ladder pivot axis, between a first planar position wherein the ladder lies within the plane of the step platform and a second planar position wherein the ladder is transverse to the plane of the step platform, and wherein the lowermost end of the ladder defines an arcuate travel path having a constant radius of rotation about the pivot axis when travelling between the first planar position and the second planar position; and
- a platform handle pivotably mounted to the step platform by a handle hinge, the platform handle being pivotable about the handle hinge between a deployed handle position adopted when the step platform is in the horizontal deployed position and a stowed handle position adopted when the step platform is in the vertical storage position, and wherein a linkage member interconnects the platform handle and the base to displace the platform handle between the deployed handle position and the stowed handle position, a first end of the linkage member being pivotally connected to the platform handle at a location on the platform handle that is spaced apart from the handle hinge, and a second end of the linkage member being pivotally connected to the base.

2. The apparatus of claim 1 wherein, when the step platform is in the vertical storage position, the ladder nests within the step platform and the step and ladder apparatus is substantially vertically aligned over the base.

3. The apparatus of claim 2, wherein, when the step platform is in the vertical storage position, and when the ladder is rotated down onto the step platform so as to also be in a storage position, the step platform and ladder are vertically oriented and adapted to be adjacent the frame when the apparatus is mounted thereto.

4. The apparatus of claim 1 wherein the base includes a stop, and the first end of the step platform abuts against the stop when the step platform is horizontal.

5. A folding step and ladder apparatus for mounting onto a frame of a truck, adjacent a front wheel of the truck, for use by an operator of the truck for maintenance of a windshield or a wiper of the truck, wherein an engine of the truck is in front of a cab of the truck and the frame extends forwardly under the engine and adjacent the front wheel, and wherein the frame, at about an uppermost surface of the front wheel, is located below the uppermost surface of the front wheel, the apparatus comprising:

- a base adapted to be mounted onto the frame, adjacent the front wheel, the base having an upper end and a lower end, wherein, when the base is mounted to the frame via the lower end, the upper end of the base is located vertically above and at a first elevation relative to the frame and the uppermost surface of the front wheel;
- a step platform having first and second opposite ends and a length extending from the first end to the second end of the step platform, the step platform defining a plane extending along the length between the first and second ends, wherein the first end of the step platform is pivotally mounted to the upper end of the base, the step platform being pivotable between a vertical storage position and a horizontal deployed position;

a ladder having an upper end pivotally mounted to the second end of the step platform and a lowermost end opposite the upper end, the ladder being pivotable, about a pivot axis located at the second end of the step platform, between a first planar position wherein the ladder lies within the plane of the step platform and a second planar position wherein the ladder is transverse to the plane of the step platform, and wherein the lowermost end of the ladder defines an arcuate travel path having a constant radius of rotation about the pivot axis when travelling between the first planar position and the second planar position; and an elongate platform handle, the platform handle having a free handle end and an opposite platform end, wherein the platform end of the platform handle is pivotally mounted to both the platform and to a first end of a linkage member, the linkage member having a second end opposite the first end of the linkage member, the second end of the linkage member pivotally mounted to the base, and wherein when the step platform is pivoted to the vertical so as to be in a storage position the platform handle pivots so as to be substantially aligned with the step platform, and when the step platform is pivoted to the horizontal so as to be in the horizontal position, the platform handle pivots relative to the step platform so as to extend vertically upwards from the step platform to make available the handle end of the platform handle for use by the operator of the truck to grasp the handle end when ascending the ladder;

wherein, in operation, when the base is mounted to the frame, adjacent the front wheel, the upper end of the base and the first end of the step platform are elevated to the first elevation so that the first end of the step platform is elevated above and vertically spaced from the frame and the uppermost surface of the front wheel so that, when the step platform is deployed and rotated to the horizontal deployed position, the step platform crosses over the front wheel without interference so as to be located above and vertically spaced from the uppermost surface of the front wheel, and wherein, when in the horizontal deployed position, the length of the step platform positions the second end of the step platform to an outside of the front wheel so that when the ladder pivots downwardly from the second end of the step platform the ladder hangs so as to cross downwardly over the front wheel to thereby allow the operator to ascend the ladder and step onto the step platform to access the windshield or the wiper.

6. The apparatus of claim 5, wherein the platform handle is offset from the step platform.

7. The apparatus of claim 1 wherein the step platform further comprises opposite first and second platform rails, the first and second platform rails positioned perpendicular to and sandwiching the opposite first and second ends of the platform and extending downwardly from a support surface of the step platform when the step platform is in the horizontal position, the first and second platform rails and the support surface defining a platform cavity therebetween, the step platform having a platform width extending between the first and second platform rails, and the ladder further comprising opposite first and second legs and a plurality of rungs extending perpendicularly between the opposite first and second legs of the ladder, the first and second legs of the ladder defining a ladder width extending from the first leg to the second leg of the ladder, and wherein when the step platform is pivoted to the horizontal so as to be in the horizontal position the ladder is in the horizontal position and coaxially aligned with the step platform, the ladder width is less than the platform width and the upper end of the ladder is slidably connected to the first and second platform rails to thereby allow the operator of the truck to slide the first and second legs of the ladder along the first and second platform rails so as to slide the ladder into the platform cavity into a ladder storage position.

8. The apparatus of claim 7, wherein when the ladder is in the ladder storage position and the step platform is in the platform storage position, the step platform and ladder are vertically adjacent the frame, and wherein the truck includes a hood defining a wheel well which covers the front wheel when the hood is closed, and wherein the hood also includes a mud guard defined by an interior of the wheel well which, when the hood is closed, extends between the front wheel and the step platform and ladder when in their storage positions to thereby inhibit a build-up of mud splashing onto the step platform and ladder.

9. The apparatus of claim 1, wherein the platform handle has a lower end mounted to the step platform and an upper end located at a higher elevation than the lower end when the step platform is in the horizontal deployed position.

10. The apparatus of claim 9, wherein the lower end of the platform handle is pivotably mounted to the step platform between the first and second opposite ends.

11. The apparatus of claim 10, wherein the platform handle is laterally offset from the step platform and from the ladder in both the deployed handle position and the stowed handle position.

12. A folding step and ladder apparatus adapted to be mounted onto a truck for providing maintenance access thereto, the apparatus comprising:

a base adapted to be fastened to a frame of the truck adjacent a front wheel;

a step platform having a first end pivotably mounted to the base and a second end opposite the first end, the step platform being pivotable between an upright storage position wherein the step platform extends upwardly from the base and a deployed position wherein the step platform extends outwardly from the base and is configured to support the weight of an operator standing thereon; and a ladder telescopically received within the step platform, the ladder being slidingly displaceable in a substantially horizontal plane defined by the step platform between a retracted ladder position and a fully extended ladder position, the ladder being stored within the step platform in the retracted ladder position, and the ladder having an upper end pivotable about a pivot axis, the pivot axis being located at the second end of the step platform when the ladder is in the fully extended position; and a platform handle pivotably mounted to the step platform and pivotable about a handle hinge between a deployed handle position adopted when the step platform is in the deployed position and a stowed handle position adopted when the step platform is in the upright storage position, a linkage member interconnecting the platform handle and the base to displace the platform handle between the deployed handle position and the stowed handle position, a first end of the linkage member being pivotally connected to the platform handle at a location on the platform handle that is spaced apart from the handle hinge, and a second end of the linkage member being pivotally connected to the base;

wherein when the ladder is in the fully extended ladder position, the ladder rotates, about the pivot axis, out of the substantially horizontal plane and towards the ground by pivoting between a first planar position in the substantially horizontal plane and a second planar position transverse to the substantially horizontal plane, and rotation of the ladder about the pivot axis is prevented when the ladder is sliding in the substantially horizontal plane between the retracted ladder position and the fully extended ladder position.

13. The apparatus of claim 12, wherein when the ladder is in the second planar position, the ladder abuts a stop that limits rotational movement of the ladder about the pivot axis.

14. The apparatus of claim 13, wherein when the ladder is in the second planar position, an interior angle is defined between the ladder and the substantially horizontal plane defined by the step platform, the angle remaining fixed when a load is applied on a step of the ladder.

15. The apparatus of claim 14, wherein the angle is obtuse.

16. The apparatus of claim 12, wherein the platform handle has a lower end mounted to the step platform and an upper end located at a higher elevation than the lower end when the step platform is in the deployed position.

17. The apparatus of claim 16, wherein the lower end of the platform handle is pivotably mounted to the step platform between the first and second ends.

18. The apparatus of claim 17, wherein the platform handle is laterally offset from the step platform and from the ladder in both the deployed position and the stowed position.

19. The apparatus of claim 12, wherein the base has an inner end adapted to be fastened to the frame of the truck and an upper end including a hinge defining a platform pivot axis about which the step platform pivots, the upper end of the base having an upper-end top edge located vertically above a base-inner top edge of the inner end, and the upper end having an upper-end bottom edge located vertically below the base-inner top edge of the inner end.

20. The apparatus of claim 19, wherein the pivot axis of the ladder is located at a higher elevation than the platform pivot axis.

21. The apparatus of claim 1, wherein the ladder pivot axis is located at a higher elevation than the platform pivot axis.

* * * * *